UNITED STATES PATENT OFFICE.

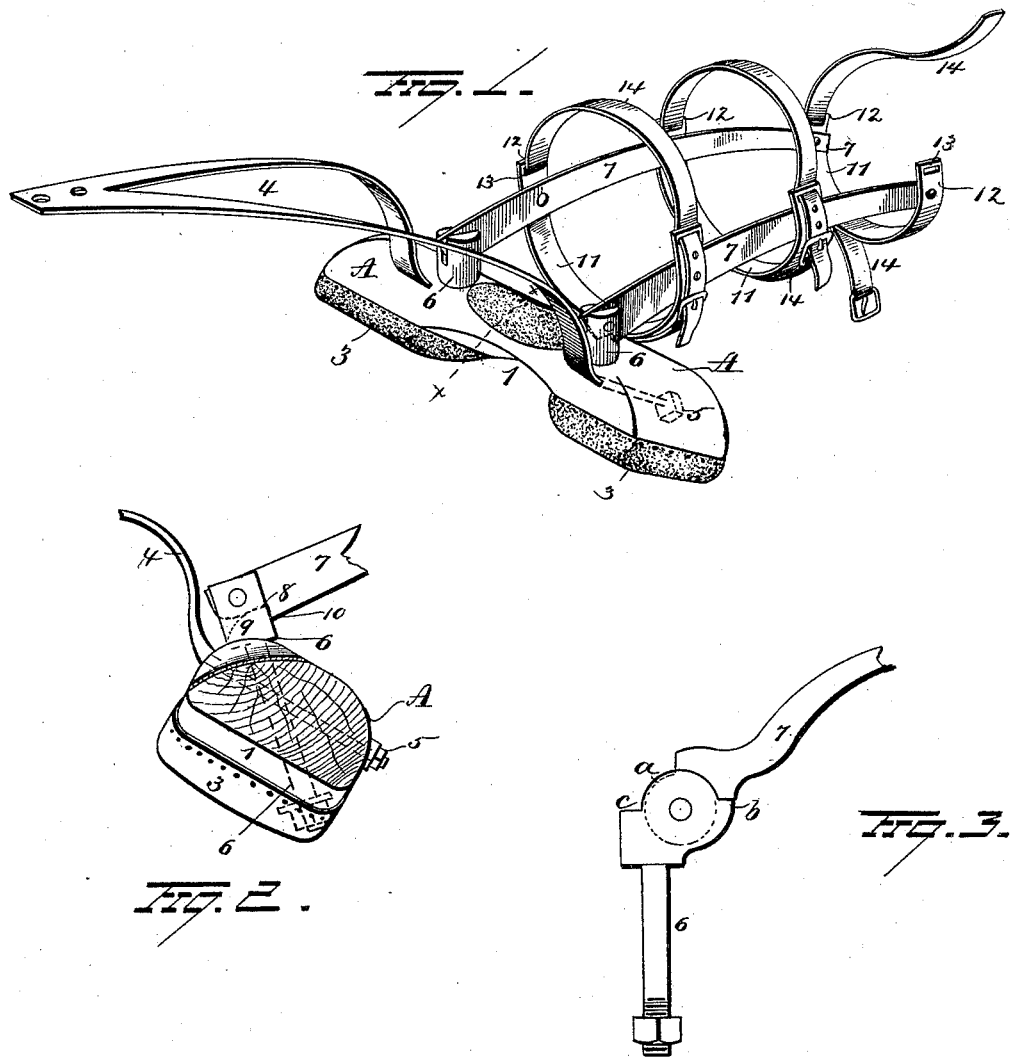

LEWIS SANDERS ELLIS, OF EMINENCE, KENTUCKY.

CRUPPER.

SPECIFICATION forming part of Letters Patent No. 408,340, dated August 6, 1889.

Application filed May 2, 1889. Serial No. 309,360. (No model.)

*To all whom it may concern:*

Be it known that I, LEWIS SANDERS ELLIS, of Eminence, in the county of Henry and State of Kentucky, have invented certain new and useful Improvements in Cruppers for Harnesses; and I do hereby declare the following to be a full, clear, and exact description of the invention, such as will enable others skilled in the art to which it appertains to make and use the same.

My invention relates to an improvement in cruppers for harness.

The object is to provide an attachment capable of being employed on any harness, and designed especially to confine the motion of a horse's tail, so that it cannot be thrown sidewise over the lines or where it will catch in the buckles of the harness. A further object is to furnish an attachment which will give the proper carriage to the tail without chafing or irritating the horse or form a clumsy and unsightly part of the harness, but will, on the contrary, be rather ornamental than otherwise.

With these ends in view my invention consists in certain novel features of construction and combinations of parts, as will be hereinafter fully described, and pointed out in the claims.

In the accompanying drawings, Figure 1 is a view in perspective of my improved crupper. Fig. 2 is a view on line *xx* of Fig. 1, and Fig. 3 is a modification.

A represents a bridge-piece, which spans the cavity immediately beneath a horse's tail, resting at the ends upon the buttocks. This bridge-piece is preferably made of wood, and is somewhat peculiar in form, and hence a detailed description will ensue. It is hollowed out in the middle 1 just over the cavity, in order to form no obstruction, and on the opposite side it is rounded in and padded to receive and furnish a rest for the tail. The ends 3 3, which rest upon the buttocks, are flat and nicely padded, so as to rest easily upon the horse, and the other parts of the bridge-piece are rounded off and finished as much as possible, to occupy as little space as possible, and the whole is covered over with leather or other suitable material to give it a pretty and ornamental appearance, while at the ends rosettes or other ornamental devices may be attached to give a finish.

The bridge-piece A is held on the harness or to the back pad by means of the branched strap 4. Said strap may be made of leather or of thin metal, and bent, as shown, with its ends inserted in the bridge-piece, where they are secured by nuts or similar devices 5 5.

A pair of bolts 6 6, or devices of similar character, are held in the bridge-piece at suitable distances apart, and the upper ends of these bolts are split. Curved brace-plates 7 7 are pivoted in these split ends something after the manner of a knife-blade, shoulders 8 8 being formed at the ends to abut against the webs 9 9 in the bolts when the brace-plates are raised. Shoulders 10 10 are also formed on the lower edges of the brace-plates near the pivots, and these when they come in contact with the bolts limit the downward inclination of the plates.

A number of U-shaped ribs 11 11 11 are pivoted to the curved plates, and their ends 12 12, which extend a trifle beyond the curved plates, are provided with slots 13 13, and straps 14 14, passed around these ribs and through the slots, are buckled together over the tail, holding it in place, so that its motion and its position is confined to that of the pivoted skeleton frame just described.

The parts may be made of wood, metal, or any material found most serviceable for the purpose, it merely being essential that the device should be as light and small as possible.

In the modification simply a different form of hinge is shown. In this case the bolt 6 terminates at one end in a pair of ears *a a*, and lugs *b b* project out of these ears at one side, and a shoulder *c* is formed opposite the lugs, these being adapted to limit the vibrations of the curved plate 7, which abuts upon the lugs or the shoulder as the tail is switched down or up.

Owing to the construction it is impossible for the crupper to sink into the cavity beneath the tail, as other cruppers do, and, furthermore, it gives a fine carriage to the tail, and when placed on a span of horses they will both carry their tails just alike, and they will be prevented from crooking their tails.

The great beauty of the device is that the horse very soon becomes accustomed to it, and a few applications may be sufficient, as it requires but little time to train the horse so that it may be dispensed with entirely.

It is evident that slight changes might be resorted to in the form and arrangement of the several parts described without departing from the spirit and scope of my invention. Hence I do not wish to limit myself to the particular construction herein set forth; but, Having fully described my invention, what I claim as new, and desire to secure by Letters Patent, is—

1. In a crupper, the combination, with a bridge-piece and means of attachment to a harness, of a pair of curved brace-plates pivoted to the bridge-piece, ribs secured to the brace-plates, and straps or similar devices for confining the tail of an animal in place in the ribs, substantially as set forth.

2. In a crupper, the combination, with a bridge-piece hollowed out, padded, and covered, substantially as described, and a branched strap by which the bridge-piece is fastened to a harness, of a pair of split bolts, brace-plates pivoted thereto, slotted U-shaped ribs pivoted to said brace-plates, and straps extending around the ribs and through the slots, substantially as set forth.

In testimony whereof I have signed this specification in the presence of two subscribing witnesses.

LEWIS SANDERS ELLIS.

Witnesses:
W. S. WILSON,
W. O. MOODY.